July 3, 1923.
C. W. HOWE ET AL
1,460,585
GRADING AND SCARIFYING DEVICE FOR TRACTORS
Filed July 25, 1921    3 Sheets-Sheet 1
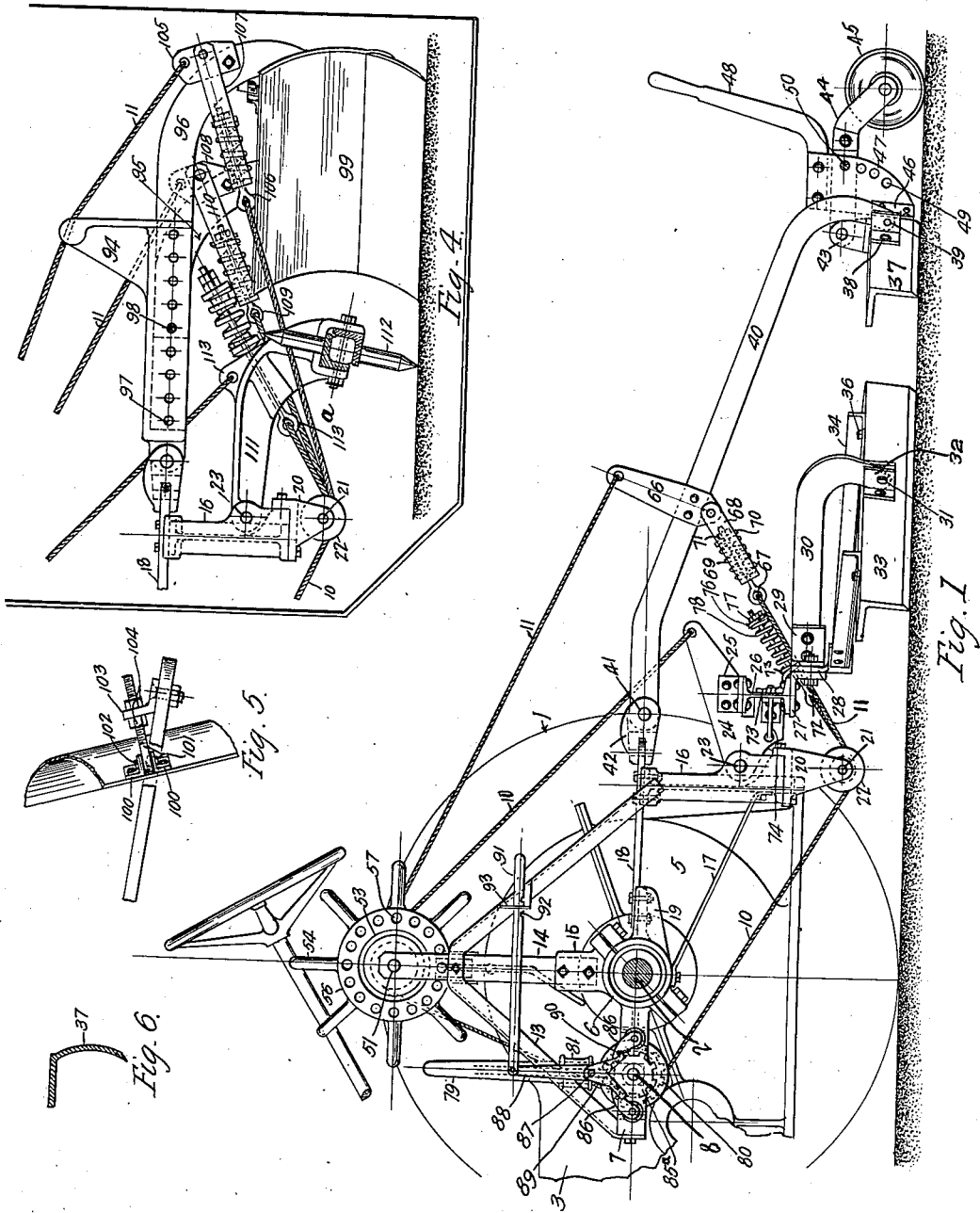
WITNESS:
INVENTORS
Charles W. Howe and
BY Joseph L. Garner,
Howard D. Smith
Their ATTORNEY.

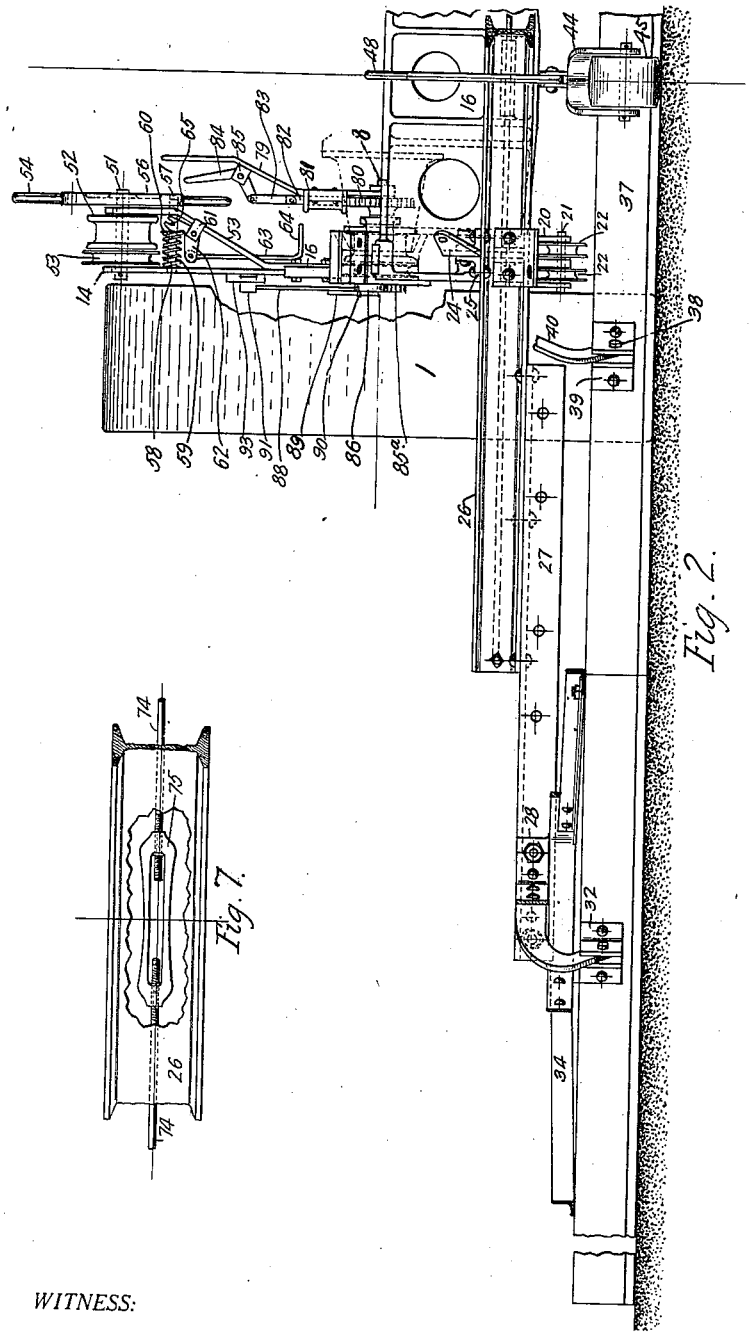

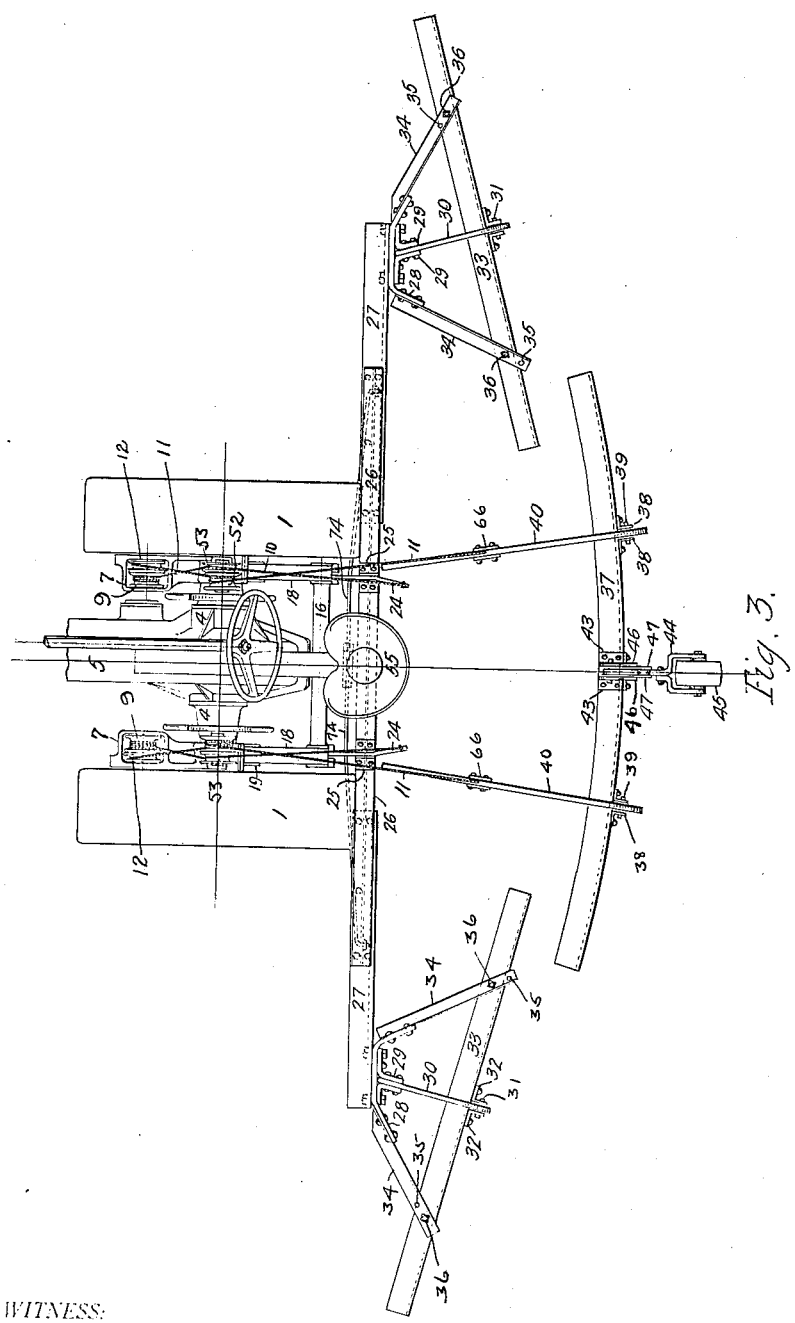

Patented July 3, 1923.

1,460,585

UNITED STATES PATENT OFFICE.

CHARLES W. HOWE, OF DAYTON, AND JOSEPH L. GARVER, OF HAMILTON, OHIO.

GRADING AND SCARIFYING DEVICE FOR TRACTORS.

Application filed July 25, 1921. Serial No. 487,224.

*To all whom it may concern:*

Be it known that we, CHARLES W. HOWE and JOSEPH L. GARVER, citizens of the United States, residing, respectively, in the city of Dayton, county of Montgomery, and State of Ohio, and in the city of Hamilton, county of Butler, State of Ohio, have invented certain new and useful Improvements in Grading and Scarifying Devices for Tractors, of which the following is a specification.

The principal object of our invention is the provision of improved means that may be readily attached to tractors, for economically and efficiently grading, scraping and scarifying roads and other surfaces. These means, which are an improvement upon those disclosed in our United States Letters Patent No. 1,373,561, granted April 5th, 1921, are freely adjustable and show increased efficiency when in use. Their manufacture is cheapened, their assembly is facilitated, and they can be changed more readily from one machine to another.

Other important and incidental objects will be brought out in the following specification, and particularly set forth in the subjoined claims.

In the accompanying drawings Figure 1 is a side elevational view of the rear part of a tractor to which our improved grading devices are attached. Figure 2 is a rear view of the same. Figure 3 is a top plan view thereof. Figure 4 is a side view, partly in section, of the scarifying and scraping means. Figure 5 is a top plan view of the scraper plate adjusting means. Figure 6 is a cross sectional view taken through one of the drag bars. And Figure 7 is a side view of the truss rod turnbuckle.

Throughout the specification and drawings, similar reference characters denote corresponding parts.

Referring to the accompanying drawings, the numerals 1, 1 designate the rear driving wheels, and 2 the axle therefor, in a tractor 3. The axle 2 is of the common type, being divided in two sections for each of which there is an axle housing 4 that is connected at its inner end to an elongated transmission housing 5. From the latter each axle housing 4 gradually tapers toward its respective wheel 1, where its size is considerably reduced as shown in the drawings.

Secured on each axle housing 4, is an angle casting 6 from which there projects forwardly an arm 7 in the outer eye end of which is journaled a shaft 8 on which is fixed a spool 9 that receives a cable 10. To permit a cable 11 to pass over it, independent of the cable 10, a sheave 12 is also mounted on the shaft 8. (See Figure 3).

Secured to the outer end of each arm 7 is one end of a bent angle member 13 whose apex portion is secured to the upper end of an upright member 14 that is secured at its lower end to an upwardly projecting part 15 of the angle casting 6. (See Figure 1).

Attached to the lower end of the right hand part of each angle member 13, is the upper end of a main connecting plate 16 to the lower portion of which there is connected one end of a bracing rod 17 whose other end is secured to the casting 6. The top of the connecting plate 16 is also secured to a horizontal member 18 that is secured at its inner end to a rearwardly projecting horizontal arm 19 of the angle casting 6. Bolted to the lower end of the connecting plate 16 is a forked casting 20 that supports a transverse shaft 21 on which two sheaves 22, 22 are mounted. (See Figures 1 and 2).

Pivotally secured by a pin 23 to each main connecting plate 16, is an elevating plate 24. By means of angle plates 25 bolted to the plates 24, a horizontal I beam 26 is connected to the latter. Bolted to each end of the I beam 26 is an angle piece 27 having a downwardly projecting portion to which is secured a plate 28. Between the rearwardly projecting portions of two angles 29, 29 riveted to the plate 28 the inner end of a drag arch bar 30 is riveted. The outer end of each arch bar 30 is connected by a pivot 31 between two angle plates 32, 32 that are secured to the middle portion of a side drag bar 33. (See Figures 1, 2 and 3). Each of these drag bars 33 is adz shaped in cross section as shown in Figure 6.

Riveted to each end of the plate 28, which is bent outwardly, is the rear end of the upwardly projecting flange portion of an angle bar 34. (See Figure 3). Provided in the outer end of each horizontal flange portion of each angle bar 34, are two holes 35, 35 through each one of which a bolt 36 is adapted to be passed into the drag bar 33. By passing the bolts 36 through different holes 35 in the outer ends of the bars 34, the position of the drag bar 33 may be varied.

Referring to Figures 1, 2 and 3, the numeral 37 designates a circumferential center drag bar whose shape in cross section is similar to that of the side drag bars 33, 33. (See Figure 6). Approximately midway between the middle and each end of the drag bar 37 there is riveted two angle pieces 38, 38 between which there is connected by a pivot pin 39, the outer end of a curved pull bar 40. The inner end of each pull bar 40 is connected by a pivot pin 41 to a forked casting 42 that is in turn pivotally secured, for lateral movement, to the outer end of one of the horizontal members 18. (See Figure 1).

Riveted to the middle portion of the center drag bar 37 are two angle pieces 43, 43 between which there is connected the inner end of a roller bar 44, the outer end of which is forked to pivotally support a roller 45. Riveted to the drag bar 37 below each set of angle pieces 43, 43, are two angle pieces 46, 46 between which are riveted two tin plates 47, 47. Riveted between the top portions of the tin plates 47, 47 is the lower end of a handle 48 by which the pitch of the middle portion of the center drag bar 37 may be varied to raise it while the ends of said bar remain upon the ground, as when it is desired to crown a road or other surface. Near the outer vertical edge of each pin plate 47 is a series of holes 49. Through two adjacent holes 49, 49 in the plates 47, and a transverse hole in the roller bar 44, a pin 50 is adapted to be passed to hold the middle portion of the drag bar 37 in a desired elevated position, the roller bar being supported by the roller 45 that travels over the surface of the ground. (See Figures 1 and 2).

For the purpose of raising and lowering the entire center drag bar 37 through the pull bars 40, 40, the following means are provided. Referring to Figures 1 and 2, the top portion of each upright member 14 receives one end of a shaft 51 on which a drum or spool 52 is fast. On this shaft 51 a sheave 53 is loosely mounted to permit the cable 10 to pass around the spool 52 independent of the cable 11. The inner end of the shaft 51 is journaled in the top portion of a bent bar 53 whose extreme lower end is attached to the upright member 14. On the inner end of each one of the shafts 51, 51, a pilot wheel 54 is fast, whereby the spools 52 may be conveniently turned by the driver who sits upon a seat 55. (See Figures 1 and 2).

For the purpose of preventing either one of the spools 52, 52 from being turned, thereby to hold the center drag bar 37 in a desired position, the following construction is provided. The middle portion of the pilot wheel 54 consists of a circular plate 56 that contains a circumferential series of holes 57. Adapted to be forced by a spring 58 into any one of the holes 57 in said plate, is a pin 59 whose front end passes through a hole in its respective bar 53. The spring 58 surrounds the pin 59 between the upright member 14 and a collar 60 mounted on said pin. (See Figure 2).

When it is desired to rotate one of the spools 52 by its respective pilot wheel 54, the pin 59 belonging to that wheel, is withdrawn by the following means. Referring to Figure 2, there is secured to the inclined portion of each bar 53, a pivotal support 61 for a bell crank lever 62, one end of which is forked to straddle the shaft 51, while its other end is pivotally connected to the upper end of a downwardly projecting rod 63 having a right angled lower end 64. Each part of the forked end of the bell crank lever 62 is recessed to permit the latter to engage a transverse pin 65 in the shaft 51 beyond the collar 60. Now when the driver presses his foot downwardly upon the right-angled portion 64 of the rod 63, the latter will cause the forked end of the bell crank lever 62 to press against the pin 65 to withdraw the front end of the latter from one of the holes 57 in the pilot wheel 54, to permit the latter to be turned by him to raise or lower the drag bar 37 through the cable mechanism now to be described.

Referring to Figure 1, there is secured to the middle portion of each pull bar 40, an arm 66 to the outer end of which one free end of the cable 11 is attached. The other free end of each cable 11 is secured to the eye end of a respective spring rod 67 that enters a receiving member 68 that is secured, at an angle, to the lower end of the arm 66. Encircling the rod 67 within the member 68 is a coil spring 69 whose inner end bears against a collar 70 that is maintained on said rod by a nut 71. This spring construction for attaching the cable 11 to the lower end of the arm 66, compensates for any inequalities in the ground when pressure is exerted upon a respective pull bar 40 by said cable, to force the center drag bar 37 into the road or other surface being graded.

Each cable 11 passes upwardly around its respective spool 52, being wound sufficiently tight around the latter to permit it to raise the drag bar 37 when the pilot wheel 54 is turned in one direction, or to draw it into the ground when said wheel is turned in the opposite direction. From each spool 52 the cable 11 passes downwardly over the loose sheave 12 on the shaft 8, and then over an idler pulley 22 to its respective spring rod 67. (See Figures 1 and 2).

The upper free ends of the cables 10, 10 for raising the side drag bars 33, 33, are attached to the upper ends of the elevating plates 24, 24 respectively. The lower free end of each cable 10 is attached to the eye end of a respective spring rod 72 that loosely passes through a hole in the lower end of an angle plate 73 riveted to the I beam 26. To assist in supporting the outer ends of the latter, truss rods 74 are provided. One end of each truss rod 74 is connected to an outer end of the I beam 26, while the inner ends of said truss rods are received by a turnbuckle 75 by which said rods are tensioned. Each truss rod 74 passes through a hole in its respective elevating plate 24, whereby when the said plates 24 are elevated, the truss rods will assist in raising the outer ends of the I beam 26 that support the side drag bars 33. (See Figures 1, 2 and 7).

Surrounding each spring rod 72 between its respective angle plate 73 and a collar 76 maintained on the outer end of said rod by a nut 77, is a spring 78 that provides a resilient connection for the lower end of a cable 10, to compensate for inequalities that the side drag bars 33 encounter in the ground. Each cable 10 passes upwardly around the sheave 53 provided for it on a respective shaft 51, and then downwardly and tightly around a respective spool 9, and thence around an idler pulley 22 to a respective spring rod 72. (See Figures 1 and 3).

For the purpose of rotating the spools 9, 9 to raise the side drag bars 33, 33, or draw them into the ground, the following means are provided. Loosely mounted on the inner end of each shaft 8 is a hand lever 79, and fixedly secured to that end of the shaft is a ratchet wheel 80. Secured to the lower end of each lever 79, over the ratchet wheel 80, is a cylinder 81 through which a dog 82 is movable into engagement with the teeth of said wheel. The upper end of said dog is connected to a link 83 that is secured to one end of a bell crank 84 secured to a pivot piece 85 attached to the lever 79. The dog 82 is normally in engagement with the ratchet wheel 80 so that when the handle 79 is pulled in one direction by the driver, it will rotate its respective spool 9 to draw upon the cable 10 which is tightly wound upon it, to raise a respective side drag bar 33; and when the handle 79 is moved in the opposite direction, it will cause said cable to draw the drag bar into the ground. Each time the handle has been moved a desired distance in one direction, inward pressure exerted upon the upper end of the bell crank lever 84 will raise the dog 82 from engagement with the ratchet wheel 80 to permit the handle 79 to be returned to the starting point preparatory to imparting further turning movement to the spool 9. (See Figures 1 and 2).

The spools 9, 9 are tightly held against rotation by the following means. Referring again to Figures 1 and 2, there is fast on the outer end of each shaft 8, a ratchet wheel 85ª, the teeth of which are adapted to be engaged from either side by a pawl 86 pivotally secured to the arm 7 of the casting 6. Pivotally secured by a pin 87 to the forwardly projecting arm 7 of the casting 6, is a lever 88 to which the apex portion of an angle member 89 is pinned. The outer edge portion of each free end of this angle member 89 is adapted to engage a transverse pin 90 in the outer end of each pawl 86. To the upper end of the lever 88 is pivotally secured one end of a horizontal bar 91 in the lower outer edge portion of which there is provided a series of notches 92. The notched end of the bar 91 passes through a staple-shaped element 93 secured to the angle member 13. Now when the spool 9 to which a ratchet wheel 85 belongs, is to be turned in one direction, the driver may conveniently reach down to the outer end of the horizontal bar 91 and push it in a direction opposite to that in which the spool is to be rotated. When this is done, the angle member 89 will engage the pin 90 on the pawl 86 toward which the spool 9 is to be turned, to withdraw it from engagement with the ratchet wheel 85, thereby permitting the spool 9 to be turned in that direction by the handle 79. The other pawl 86, not being engaged by the angle member 89, is permitted to engage the teeth of said ratchet wheel to prevent the reverse movement of said spool under the pressure of the cable wound about it. The spool may then be held in the position to which it has been turned, by bringing one of the notches 92 in the outer end of the horizontal bar 91, over the lower outwardly-projecting part of the element 93. It is thus possible by the horizontal bars 91, 91 that are within easy access of the driver, to lock the ratchet wheels 85, 85 against movement, or to withdraw the pawls 86, 86 from engagement with them to permit the spools 9, 9 to be turned. (See Figures 1 and 2).

The center drag bar 37 may be readily removed from the tractor by withdrawing the pins 41 from the pull bars 40, 40 to detach them from the castings 42, 42 respectively, and also by detaching the cables 11, 11 from the arms 6, 6. The side drag bars 33, 33 may with equal ease be removed by withdrawing the pins 23, 23 from the connecting plates 16, 16 respectively, and also by detaching the ends of the cables 10, 10 from the parts to which they are connected. (See Figure 1).

The scraping device may now be easily attached to the tractor by connecting the arch bar casting 94 to the left hand forked casting 42 by means of one of the pins 41, and the arch bar 95 to the right hand forked casting 42 by means of the other pin 41. (See Figure 4). The horizontal portion of the arch bar casting is hollow to receive an arch bar 96 that slides into it. Holes 97 are provided in both the arch bar casting and the bar 96 to receive pins 98 to adjustably secure said bar in the casting.

A scraper 99 is adjustably secured to the arch bars 94 and 96 as follows. Referring to Figures 4 and 5, there is riveted to the upper back portion of the scraper plate 99, two sets of angle clips 100, 100 between which an eye bolt 101 is pivotally secured by means of a pin 102. The rear end of the eye bolt 101 passes through an angle member 103 which is bolted to the arch bar 96 as shown in Figure 5. By means of nuts 104, 104, one on each side of the angle member 103, the scraper plate 99 may be adjusted to a desired inclined position and firmly held in said position by the nuts.

One end of a cable 11 is attached to a plate 105 secured to the arch bar 96, while the other free end thereof is secured to an eye rod 106 that is received by an elongated spring-containing member 107 that is connected to the plate 105. One end of the other cable 11 is secured to a plate 108 attached to the arch bar 95, while the other free end of said cable is secured to an eye rod 109 that is received by a spring-containing member 110 that is attached to the plate 108. By means of the cables 11, 11, the scraper plate 99 may be raised and lowered in the same manner as the center drag bar 37.

By means of the pins 23, 23, an arch scarifier-tooth bar casting 111 is secured to each connecting plate 16. (See Figure 4.) This casting has a forked end within which a series of scarifier teeth 112 may be secured as described in our United States Letters Patent No. 1,373,561 before referred to. To an ear 113 on each casting 111, one end of a cable 10 is attached, while the other end of said cable is resiliently secured by a rod 113ª, to said casting in the same manner that the rod 72 is secured to the angle plate 73 before described.

We do not wish to be limited to the details of construction and arrangement herein shown and described, and any changes or modifications may be made therein within the scope of the subjoined claims.

Having described our invention, we claim:

1. In a device of the type described, the combination with a rear axle of a tractor, of a casting secured thereto, an upwardly, a forwardly, and a rearwardly projecting arm on said casting, an upright member secured to the upwardly projecting arm on said casting, an angle member secured at its apex portion to the upright member and at its inner end to the forwardly projecting arm on said casting, a vertical connecting plate secured to the rear end of said angle member, a drag bar elevating member pivotally secured to said connecting plate, and means mounted upon the forwardly projecting arm of said casting for raising and lowering the drag bar elevating member.

2. In a device of the type described, the combination with the rear end of a tractor, of rearwardly projecting pull bars, means for connecting said bars to the rear end of the tractor, a circumferential drag bar secured to the outer ends of said pull bars, a roller bar secured at its inner end to the drag bar between the pull bars, a roller secured to the outer end of said roller bar, a pair of pin plates containing holes near their outer edges, secured to the middle portion of said drag bar in a position to straddle the roller bar, a handle secured to said pin plates above the roller bar, and a pin adapted to be passed through any two adjacent holes in the pin plates, and through the roller bar between them to hold the middle portion of the drag bar in an elevated position after it has been raised by said handle.

3. In a device of the type described, the combination with the rear end of a tractor, two elevating arms pivotally secured thereto, an I beam attached to said arms, a drag bar attached to said I beam, a pair of truss rods, each truss rod passing through a respective elevating arm for connection to the outer end of said I beam, and a turnbuckle connecting the inner ends of said truss rods, for the purpose specified.

In testimony whereof we have hereunto set our hands this 22d day of July, 1921.

CHARLES W. HOWE.
JOSEPH L. GARVER.

Witness:
HOWARD S. SMITH.